(12) United States Patent
Kang et al.

(10) Patent No.: US 7,664,165 B2
(45) Date of Patent: Feb. 16, 2010

(54) CORRELATION APPARATUS BASED ON SYMMETRY OF CORRELATION COEFFICIENT AND METHOD THEREOF

(75) Inventors: Hun-Sik Kang, Daejon (KR); Jung-Sik Kim, Daejon (KR); Do-Young Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 617 days.

(21) Appl. No.: 11/284,215

(22) Filed: Nov. 21, 2005

(65) Prior Publication Data

US 2006/0126766 A1 Jun. 15, 2006

(30) Foreign Application Priority Data

Dec. 13, 2004 (KR) .............. 10-2004-0104797

(51) Int. Cl.
   *H04B 1/00* (2006.01)
(52) U.S. Cl. .............. 375/152; 359/306; 367/100; 375/142; 375/150; 375/343; 379/390.02
(58) Field of Classification Search ............. 375/130, 375/152, 308, 343; 600/518; 708/313, 422
   See application file for complete search history.

(56) References Cited

U.S. PATENT DOCUMENTS

| 5,901,189 A | 5/1999 | Rose |
| 6,005,899 A | 12/1999 | Khayrallah |
| 6,738,794 B2 | 5/2004 | Stein et al. |
| 2002/0122466 A1 | 9/2002 | Somayazulu |
| 2002/0124036 A1* | 9/2002 | Rawlins et al. .............. 708/422 |
| 2003/0026269 A1 | 2/2003 | Paryani |
| 2003/0026295 A1 | 2/2003 | Baum et al. |

FOREIGN PATENT DOCUMENTS

| KR | 1019890011374 A | 8/1989 |
| KR | 1019900005820 A1 | 4/1990 |
| KR | 10-0307702 | 8/2001 |
| KR | 10-0392260 | 7/2003 |

OTHER PUBLICATIONS

Oppenheim & Schafer; Digital Signal Processing; 1975; Prentice Hall; pp. 24-27 and 157-160.*

* cited by examiner

*Primary Examiner*—David C Payne
*Assistant Examiner*—Adolf Dsouza
(74) *Attorney, Agent, or Firm*—Ladas & Parry LLP

(57) ABSTRACT

Provided is a correlation apparatus based on symmetry of a correlation coefficient that can reduce complexity of hardware by reducing the number of adders and multipliers. Accordingly, when values of a real number part and an imaginary number part are exchanged with respect to a middle point of a correlation coefficient sequence and divided into two parts of left and right by the middle point of the correlation coefficient sequence, the values of the real number part and the imaginary number part are even-symmetrical with respect to the middle point of the divided two parts. Therefore, the number of the adders required for forming the correlation apparatus is reduced by at least 20% and the number of the multipliers is reduced by at least 70% in comparison with the 62 adders and the 64 multipliers required for a conventional correlation apparatus.

10 Claims, 11 Drawing Sheets

| SAMPLE NUMBER | S0 | S1 | S2 | S3 | S4 | S5 | S6 | S7 | S8 | S9 | S10 | S11 | S12 | S13 | S14 | S15 |
|---|---|---|---|---|---|---|---|---|---|---|---|---|---|---|---|---|
| QUADRANT | I | II | III | IV | I | IV | III | II | I | IV | III | II | I | II | III | IV |

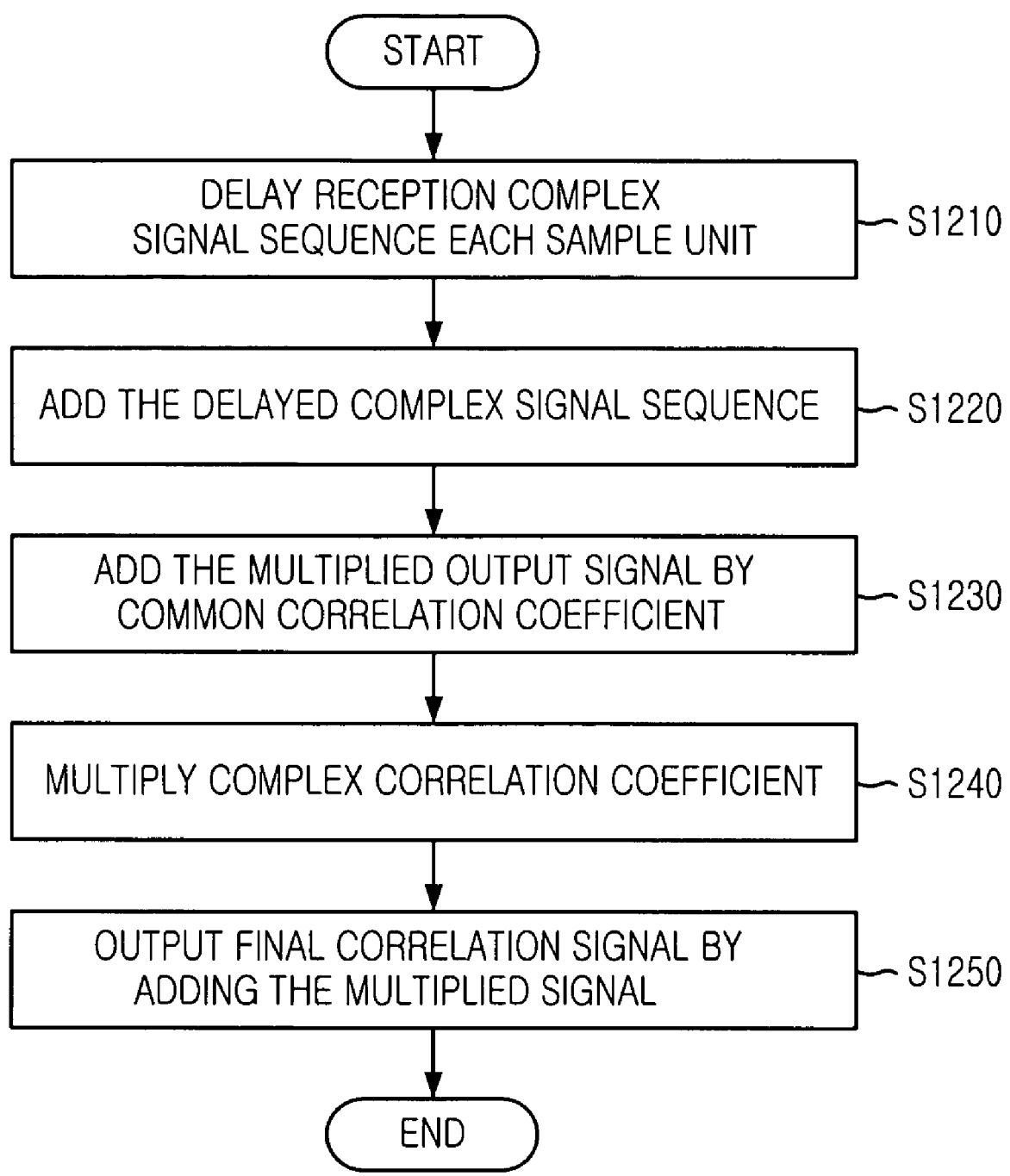

CORRELATION APPARATUS BASED ON SYMMETRY OF CORRELATION COEFFICIENT AND METHOD THEREOF

FIELD OF THE INVENTION

The present invention relates to a correlation apparatus based on symmetry of a correlation coefficient and a method thereof; and, more particularly, to a correlation apparatus that can reduce complexity of hardware by using symmetry of a correlation coefficient and reducing the number of adders and multipliers, and a method thereof.

DESCRIPTION OF RELATED ART

Recently, high-speed data communication using a Wireless Local Area Network (WLAN) is increasing since it can reduce costs by using a WLAN having characteristics such as flexible network formation, easy connection and mobility that can not be obtained from conventional wired communication.

Now the WLAN is developed and used based on the standards of the Institute of Electrical and Electronics Engineers (IEEE) 802.11.

The standards are divided into 802.11b, 802.11g and 802.11a according to a frequency band and a data rate. The 802.11b and the 802.11g are standards for the frequency band of 2.4 GHz, and the 802.11a is a standard for the frequency band of 5 GHz with a reference of related frequency band.

The 802.11b provides data rates of 1, 2, 5.5 and 11 Mbps, and uses spread spectrum as a modulation scheme.

The 802.11g supports one data rate among 6, 9, 12, 18, 24, 36, 48 and 54 Mbps by adding Orthogonal Frequency Division Multiplexing (OFDM) to supplement the 802.11b having a maximum data rate of 11 Mbps to thereby provide a maximum data rate of 54 Mbps.

The 802.11a supports one data rate among 6, 9, 12, 18, 24, 36, 48 and 54 Mbps by using the OFDM method and is determined to use a frequency band of 5 GHz.

The OFDM communication method used in the 802.11g and 802.11a of the standards follows the standard defined in "HIGH SPEED PHYSICAL LAYER IN THE 5 GHz BAND" of "WIRELESS LAN MEDIUM ACCESS CONTROL (MAC) AND PHYSICAL LAYER (PHY) SPECIFICATIONS" which is laid open in PART 11 of IEEE 802.

Various modulation methods are provided to support various data rates in the WLAN using the OFDM. Binary phase shift keying (BPSK) for 6.9 Mbps, quadrature phase shift keying (QPSK) for 12 and 18 Mbps, 16 quadrature amplitude modulation (QAM) for 24 and 36 Mbps, and 64 QAM for 48 and 56 Mbps are used.

FIG. 1 is a block diagram showing a frame in a WLAN adopting the OFDM.

As shown in FIG. 1, the frame includes a short preamble (SP) section, a long preamble (LP) section, a signal field and a data field.

The SP section includes 10 short preambles for a signal sensing, automatic gain control, synchronization acquisition and frequency variation control. The signal field has information such as data rate and data length of a transmitted frame, and the data field has actual data information.

When the frame shown in FIG. 1 is transmitted through a wireless channel, the signal is distorted due to fading caused by a multi-path. The distorted signal goes through various procedures in a receiving part and restored into an original signal. The procedure restoring the distorted signal into the original signal starts from detecting synchronization of the received signal.

A method for finding a correlation value between the received signal and a known data sequence is widely used to detect synchronization. Herein, a preamble which is made to stand interference caused by the multi-path is used as the known data sequence. The correlation is a procedure comparing the received signal with the known data sequence. For example, when the signal which is well known to a transmitting part, i.e., a signal that can be recognized even though it is not restored in a receiving part, such as a preamble signal, are loaded in a first part of a transmitting signal and transmitted, the receiving part compares the receiving signal with a signal of the known pattern in order to know a starting point of a received signal, and detects the synchronization of the received frame by using a part matched maximally. The correlation procedure can be shown as equations.

$$C_j = \sum_{i=0}^{L-1} S_i \cdot r_{j+i} \qquad \text{Eq. 1}$$

Herein, $C_j$ represents a $j_{th}$ correlation value; $S_i$ represents a known sequence used to obtain synchronization, r represents a receiving signal and L represents the entire length of the sequence for synchronization detection. An SP signal functioning as the known sequence in the WLAN using the OFDM is a signal obtained by performing Inverse Fast Fourier Transform (IFFT) on a complex signal of {0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0}. Herein, the SP signal includes 16 sample sequences in a time domain, wherein sample time is 1/20 MHz.

The SP signal is used to detect synchronization of reception input. Therefore, the correlation coefficient for detecting synchronization in WLAN using the OFDM is 16 SP sequences having a complex value.

The receiving part detects synchronization from the SP signal transmitted through a wireless channel by using a correlator or a matched filter. Herein, a correlator or a matched filter for detecting synchronization has a structure of a tapped delay line or a finite impulse response filter which has 16 SP signals as correlation coefficients.

FIG. 2 is a schematic view showing a conventional correlation apparatus.

As shown in FIG. 2, the conventional correlation apparatus includes a tapped delay line 210, a multiplying block 220 and an adding block 230. The tapped delay line 210 delays a reception input 200 as much as a length of the synchronization detection sequence. The multiplying block 220 multiplies a value delayed as much as a sample clock and an input by the synchronization detection sequence which is a value of a correlation coefficient. The adding block 230 adds a value obtained from the multiplication in the multiplying block 220. Herein, the synchronization detection sequence is 16. That is, a preamble sequence includes 16 samples.

A complex correlation apparatus shown in FIG. 2 requires to perform multiplication 64 times, which is 4*16, and an addition/subtraction procedure 62(30+16×2) times for each input sample. That is, in case of a complex input, each sample requires addition/subtraction of 2(L−1)+2*L times and multiplication of 4*L times in calculation of a value of $C_j$.

If the synchronization sequence is small, i.e., if L has a small value, the calculated value does not have a great amount of calculation. Otherwise, there is a problem that the amount of calculation increases remarkably.

Also, when realized as hardware, the conventional correlation apparatus includes multipliers and adders/subtracters as many as aforementioned, occupying 10 to 20% of the entire receiver, thereby increasing complexity of the receiver. In particular, since the multipliers require a great amount of logic elements, the complexity of the hardware increases remarkably in case many bits are inputted.

SUMMARY OF THE INVENTION

It is, therefore, an object of the present invention to provide a correlation apparatus that can reduce complexity based on symmetry of a correlation coefficient. That is, when values of a real number part and an imaginary number part are exchanged with respect to a middle point of a correlation coefficient sequence and divided into two parts of left and right by the middle point of the correlation coefficient sequence, the values of the real number part and the imaginary number part are even-symmetrical with respect to the middle point of the divided two parts.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a correlation apparatus for correlating a complex correlation coefficient sequence which is symmetrical with respect to a received complex signal sequence, including: a delaying unit for delaying the received complex signal sequence; a first adding unit for adding the complex signal sequence delayed in the delaying unit; a second adding unit for adding each output signal of the first adding unit; a correlation coefficient multiplying unit for multiplying each output signal of the second adding unit by a complex correlation coefficient of the complex correlation coefficient sequence; and a final output adding unit for adding each output signal of the correlation coefficient multiplying unit.

In accordance with another aspect of the present invention, there is provided a correlation method based on symmetry of the complex correlation coefficient sequence, including the steps of: a) delaying the received complex signal sequence; b) adding the complex signal sequence delayed in the step a); c) adding the output signals to be multiplied by a common correlation coefficient among the signals added and outputted in the step b); d) multiplying the signals obtained from the addition in the step c) by the complex correlation coefficient of the complex correlation coefficient sequence; and e) adding the signal obtained from the multiplication in the step d) multiplied by the complex correlation coefficient.

BRIEF DESCRIPTION OF THE DRAWINGS

The above and other objects and features of the present invention will become apparent from the following description of the preferred embodiments given in conjunction with the accompanying drawings, in which:

FIG. 12 is a flowchart describing a correlation procedure using symmetry of correlation coefficient in accordance with an embodiment of the present invention.

DETAILED DESCRIPTION OF THE INVENTION

The objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the point of the present invention, the detailed description will not be provided herein. The preferred embodiments of the present invention will be described in detail hereinafter with reference to the attached drawings.

In the following detailed description, the a short preamble (SP) sequence of Orthogonal Frequency Division Multiplexing (OFDM) method will be described as a complex correlation coefficient sequence, which is a reference sequence for synchronization detection, for an easy explanation. However, it is apparent that various reference sequences can be used.

Figure 1:
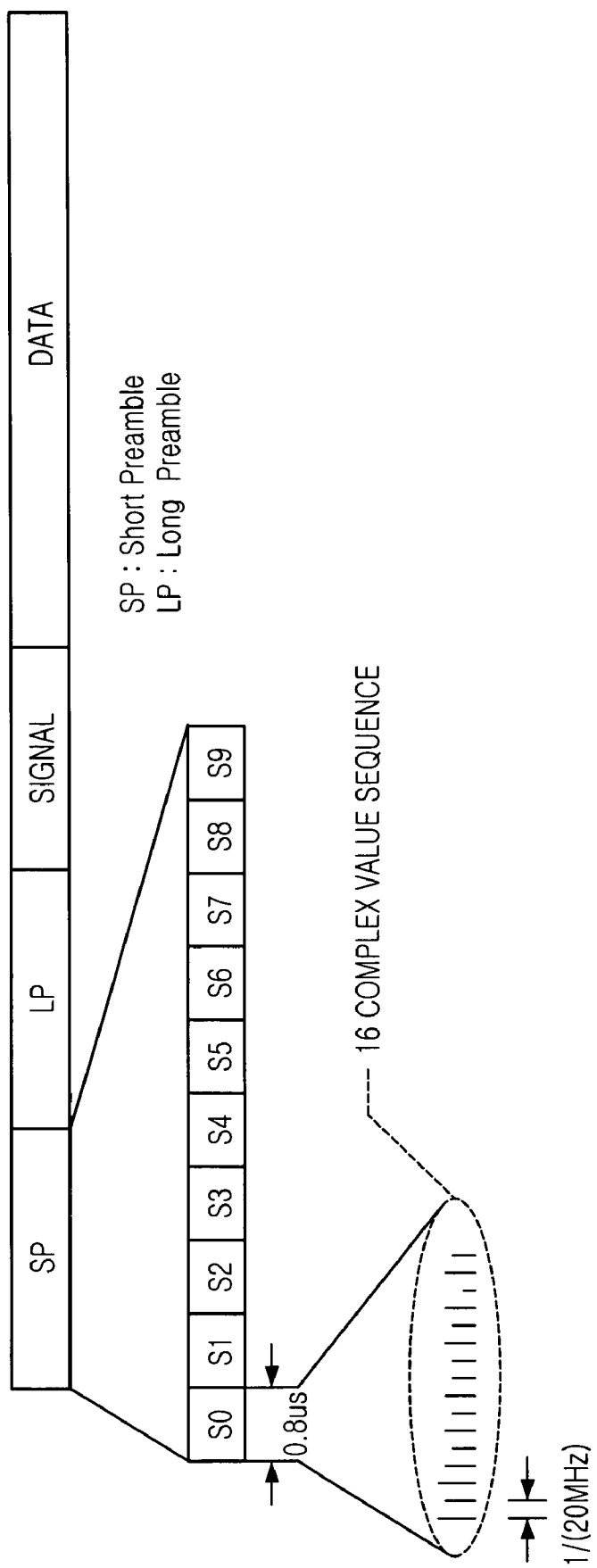
FIG. 1 is a block diagram showing a frame in a Wireless Local Area Network (WLAN) adopting an Orthogonal Frequency Division Multiplexing (OFDM)
Figure 2:
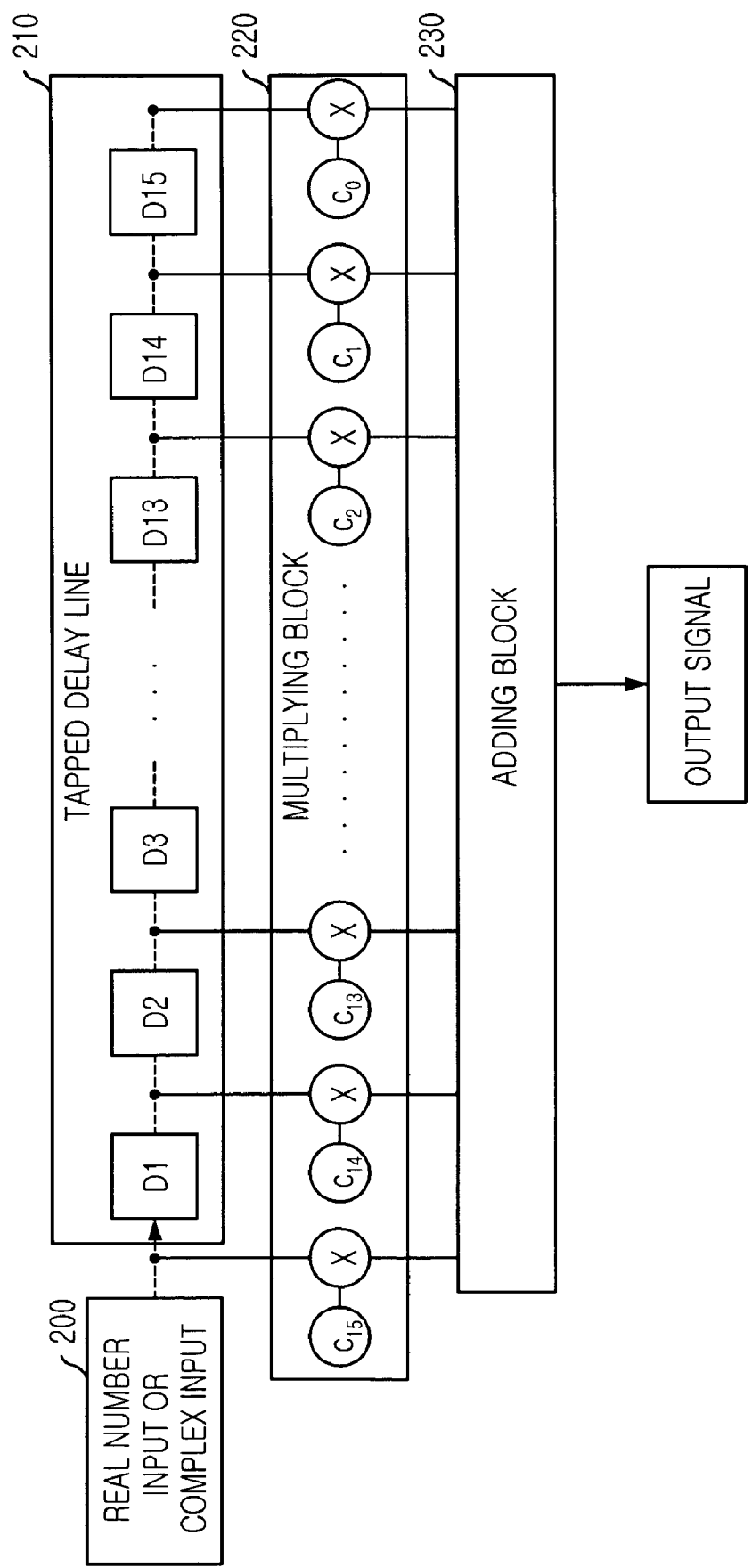
FIG. 2 is a schematic view showing a conventional correlation apparatus.
Figure 3:
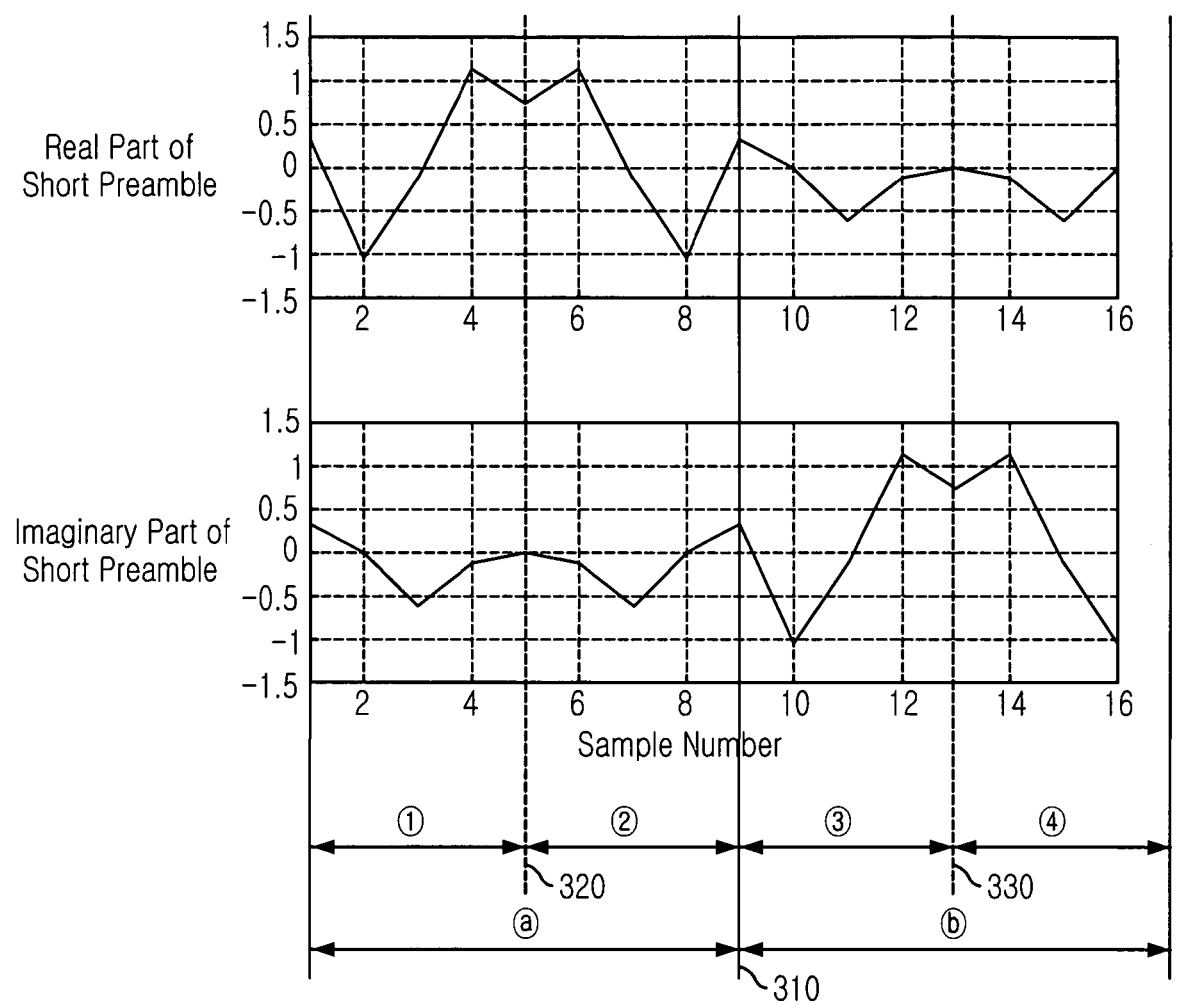
FIG. 3 is a graph showing an Inverse Fast Fourier Transform (IFFT) output of a short preamble (SP) in accordance with an embodiment of the present invention.

FIG. 3 is a graph showing an Inverse Fast Fourier Transform (IFFT) output of a short preamble (SP) in accordance with an embodiment of the present invention.

As shown in FIG. 3, the 16 IFFT outputs of the SP has two-types of symmetry. Herein, the graph in the upper part of FIG. 3 represents a real number part of the SP, and the graph in the lower part represents an imaginary number of the SP.

Each value of real number/imaginary number is divided largely into two parts of ⓐ and ⓑ, and each ⓐ and ⓑ part is divided into two parts of ① and ②, and two parts of ③ and ④. The ⓐ and the ⓑ have symmetry that the values of the real number and the imaginary number are exchanged with each other with respect to a solid line 310. That is, if the ⓐ part is x+jy, the ⓑ part is y+jx.

Meanwhile, the ① and ② parts of the ⓐ are even-symmetry with respect to a dotted line 320, and the ③ and the ④ of the ⓑ are even-symmetry with respect to a dotted line 330.

Figures 4, 5:
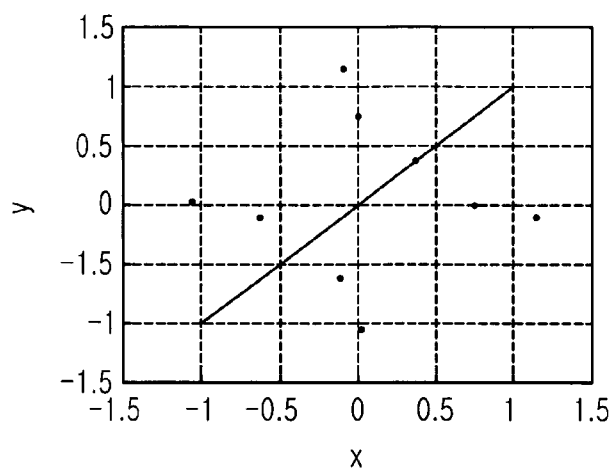
FIG. 4 is a graph showing the IFFT output of the SP on a complex plane in accordance with an embodiment of the present invention.
FIG. 5 is a table showing which quadrant the IFFT output of the SP belongs to on the complex plane in accordance with an embodiment of the present invention.

FIG. 4 is a graph showing the IFFT output of the SP on a complex plane in accordance with an embodiment of the present invention and FIG. 5 is a table showing which quadrant the IFFT output of the SP belongs to on the complex plane in accordance with an embodiment of the present invention.

As shown in FIG. 4, if 16 IFFT outputs of the SP are expressed on a complex plane, the ⓐ and the ⓑ have symmetry with respect to an y=x solid line on the complex plane. As shown in FIG. 5 expressing a position that an IFFT output of the SP is placed on a quadrant, each sample is positioned on a different quadrant.

The above symmetrical relationship should be applied to an equation of a general correlator to use symmetry of the SP. The symmetrical relationship of the SP can be expressed as equation 2.

$$(1)$$
$$C\left(n + \frac{L}{2}\right) = \underline{C(n)} = y(n) + jx(n)\Big|_{n=0,1,2,\ldots,7}$$

$$(2)$$
$$C\left(\frac{L}{4} + m\right) = C\left(\frac{L}{4} - m\right)_{m=1,2,3}$$

$$(3)$$
$$C\left(m + \frac{3 \cdot L}{4}\right) = C\left(\frac{3 \cdot L}{4} - m\right)_{m=1,2,3}$$

Eq. 2

Herein, the C(n)=x(n)+jy(n) is a complex coefficient. The $\underline{C(n)}$ is what the real number part and the imaginary number part of C(n) are exchanged, i.e., a complex coefficient of C(n+L/2). It expresses a length of the correlator.

The (1) of the equation 2 represents a relationship between the ⓐ and the ⓑ in FIG. 3. The (2) and the (3) of the equation 2 represent the relationship between the ① and ②, and the ③ and ④. When the symmetrical equation is applied to the equation of the general correlator, a relationship of the correlator to which the symmetrical relationship is applied can be obtained.

An operation of the general correlator is as shown in equation 3.

$$w(m) = \sum_{n=0}^{L-1} C(L-n) \cdot r(m-n)^*$$

Eq. 3

Herein, r(n) represents a value of a complex reception input and r(n)* represents a conjugate value of the complex reception input.

When the relationship between the (2) and the (3) of equation 2 is applied to the equation 3, the ⓐ and the ⓑ parts of FIG. 3 is expressed as equation 4.

$$a_m = C_{12} \cdot r_{m-2}^* + C_8 \cdot r_{m-7}^* + C_{13} \cdot (r_{m-2}^* + r_{m-4}^*) + C_{14} \cdot (r_{m-1}^* + r_{m-5}^*) + C_{15} \cdot (r_{m-0}^* + r_{m-6}^*)$$

$$b_m = C_4 \cdot (r_{m-11}^* + r_{m-15}^*) + C_5 \cdot (r_{m-10}^* + r_{m-12}^*) + C_6 \cdot (r_{m-9}^* + r_{m-13}^*) + C_7 \cdot (r_{m-8}^* + r_{m-14}^*)$$

Eq. 4

Herein, the $r_{m-n}$ represents $r_{(m-n)}$, and $a_m$ and $b_m$ represent the ⓐ and ⓑ parts of FIG. 3.

When the relationship of the (1) in equation 2 is applied to the equation 4, it is expressed as equation 5.

$$w_m = a_m + b_m$$
$$= (C_{13} \cdot R_{0204}^* + \underline{C_{13}} \cdot R_{1012}^*) + (C_{14} \cdot R_{0105}^* + \underline{C_{14}} + R_{0913}^*) + (C_{15} \cdot R_{0006}^* + \underline{C_{15}} \cdot R_{0814}^*) + (C_{12} \cdot R_{03}^* + \underline{C_{12}} \cdot R_{11}^*) + (C_8 \cdot R_{07}^* + \underline{C_8} \cdot R_{15}^*)$$

Eq. 5

Herein, Rij represents $r_{m-i} + r_{m-j}$, i and j are values marking integer numbers between 0 and 15 in two-digit numbers. That is, '02' is a value representing 2, and '04' is a value representing 4 in $R_{0204}$.

When the $w_m$ is divided into the real number part and the imaginary part by using the relationship of equation 6, it is expressed as equation 7.

$$C_n \cdot R_k^x + \underline{C_n} \cdot R_m^* =$$
$$\begin{cases} C_{nR}(R_{kR} + R_{mI}) + C_{nI}(R_{kI} + R_{mR}) & \text{--real number} \\ C_{nR}(R_{mR} - R_{kI}) + C_{nI}(R_{kR} - R_{mI}) & \text{--imaginary number} \end{cases}$$

Eq. 6

Real number part=$C_{13R}(R_{0204R}+R_{1012I})+C_{13I}(R_{0204I}+R_{1012R})+C_{11R}(R_{1015R}+R_{0913I})+C_{14I}(R_{0105I}+R_{0913R})+C_{15R}(R_{0006R}+R_{0814I})+C_{15I}(R_{0006I}+R_{0814R})+C_{12R}(R_{03R}+R_{11I})+C_{12I}(R_{03I}+R_{11R})+|C_8|(R_{07R}+R_{15R}+R_{07I}+R_{15I})$ (1)

Imaginary number part=$C_{13R}(R_{1012R}-R_{0204I})+C_{13I}(R_{0204R}-R_{1012I})+C_{14R}(R_{0903R}-R_{0105I})+C_{14I}(R_{0105R}-R_{0913I})+C_{15R}(R_{0814R}-R_{0006I})+C_{15I}(R_{0006R}-R_{0814I})+C_{12R}(R_{11R}-R_{03I})+C_{12I}(R_{03R}-R_{11I})+|C_8|(R_{07R}+R_{15R}-R_{07I}-R_{15I})$ (2) Eq. 7

Herein, $C_{nR}$ and $R_{nR}$ represent the real number part of $C_n$ and $R_n$, and $C_{nI}$ and $R_{nI}$ represent the imaginary number part of $C_n$ and $R_n$. Also, $R_{nr}$ and $R_{nI}$ represent summation of terms multiplied by a common complex coefficient in the tapped delay line. The $R_{nr}$ and the $R_{nI}$ appear in common in the real number part and the imaginary number part. Therefore, terms including the $R_{nr}$ and the $R_{nI}$ can use the tapped delay line of the correlation apparatus in common.

Herein, the real number part and the imaginary number part of the equation 7 have a difference in an adder/subtrator of a polynomial equation including R, and a coefficient multiplied by a polynomial equation including R has a difference in the complex coefficient. That is, if the real number part of the complex coefficient is multiplied to the real number part of the equation 7, the imaginary number part of the same complex coefficient is multiplied to the imaginary number part of the equation 7.

In case of applying the equation 2 showing the symmetrical relationship of the SP, just as equation 7, each output signal of the real number and the imaginary number of the correlation apparatus is expressed as a multiplication of 9 multipliers and a coefficient, and the correlation apparatus is realized through a total of 18 multipliers, which can reduce the multipliers about 70% in comparison with the conventional correlation apparatus requiring 64 multipliers.

Figure 6:
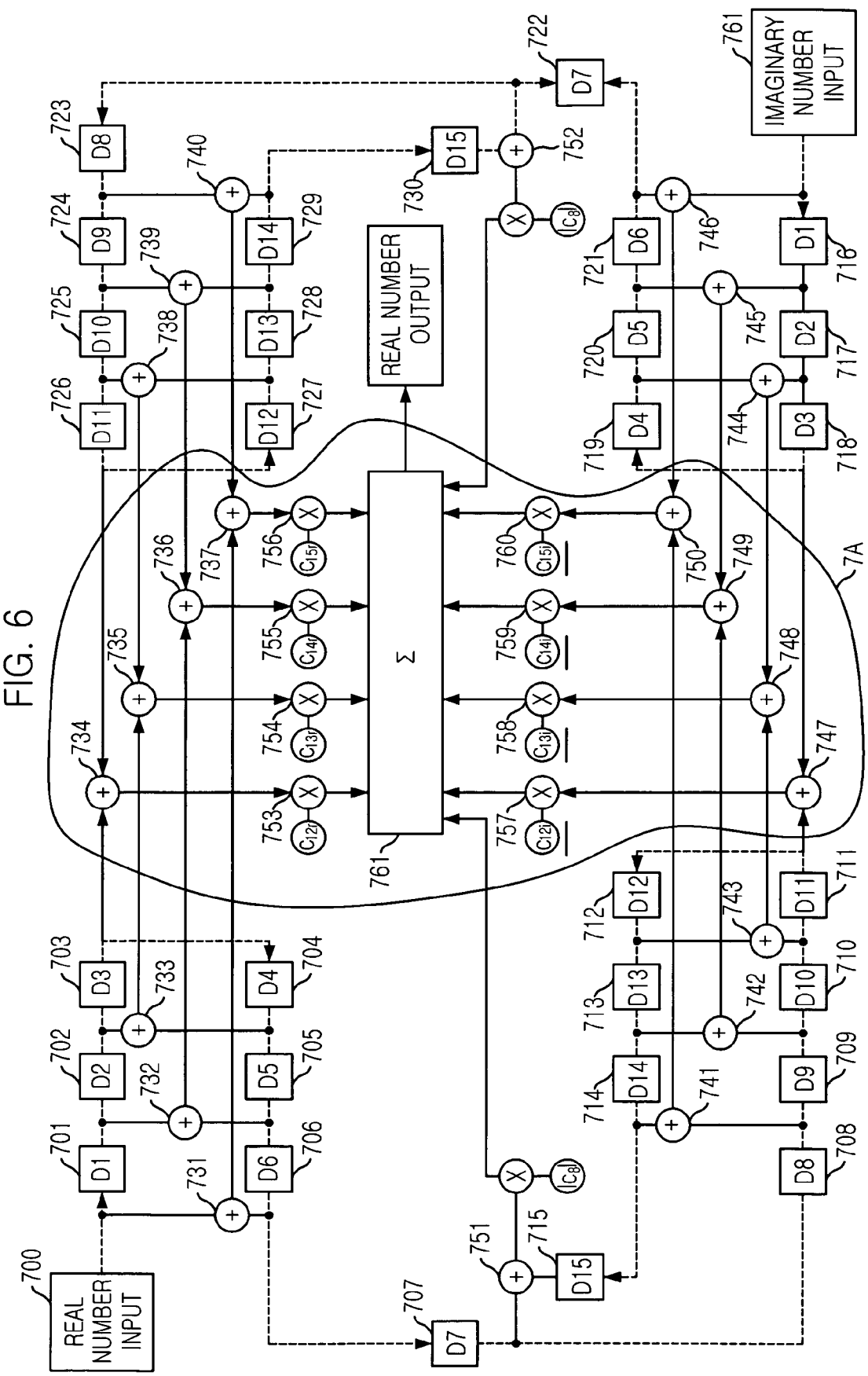
FIG. 6 is a schematic view showing a real number part of a correlation apparatus in accordance with an embodiment of the present invention.

FIG. 6 is a schematic view showing a real number part of a correlation apparatus in accordance with an embodiment of the present invention.

As shown in FIG. 6, the real number part of the correlation apparatus includes (1) of the equation 7. Since the SP and the reception input have a value of a complex number, the value of the real number output of the correlation apparatus has a real number value and an imaginary number value of the receiving signal as inputs 700 and 761.

The real number input 700 of the receiving signal is delayed as much as the sample time by 16 tapped delay lines (TDLs) 701 to 715. The imaginary input 761 of the receiving signal is also delayed as much as the sample time by 16 TDLs 716 to 730.

Each adder/subtracter and multiplier of the correlation apparatus shown in FIG. 6 corresponds to each term of the equation 7 (1). The corresponding relationship is as shown in table 1.

TABLE 1

| Each term of Eq. 7 | Adder and multiplier realized to correspond to each term |
|---|---|
| $C_{12r}(R_{03R} + R_{11I}) + _{C12I}(R_{03I} + R_{11R})$ | (753, 734), (757, 747) |
| $C_{13r}(R_{0204R} + R_{1012I}) + _{C13I}(R_{0204I} + R_{1012R})$ | (754, 733, 738, 735), (758, 743, 744, 748) |
| $C_{14r}(R_{0105R} + R_{0913I}) + _{C14I}(R_{0105I} + R_{0913R})$ | (755, 732, 739, 736), (759, 742, 745, 749) |
| $C_{15r}(R_{0006R} + R_{0814I}) + _{C14I}(R_{0006I} + R_{0814R})$ | (756, 731, 740, 737), (760, 741, 740, 750) |
| $\|C_8\|(R_{07R} + R_{15R} + R_{07I} + R_{15I})$ | (761, 751, 752) |

Referring to table 1, adders 731, 740 and 737 represent $(R_{000GR}+R_{08141})$ of the equation 7 (1). That is, the adder 731 adds a $0^{th}$ tap signal with respect to the real number input and a $6^{th}$ tap signal. The adder 740 adds an $8^{th}$ tap signal and a $14^{th}$ tap signal with respect to the imaginary number input. The adder 737 adds output of two adders 731 and 740. The method as described above can be applied to remaining terms. Meanwhile, since C8 has a value of the real number, i.e., A+j0, |C8| in table 1 does not require an additional hardware for finding an absolute value.

Figure 7:
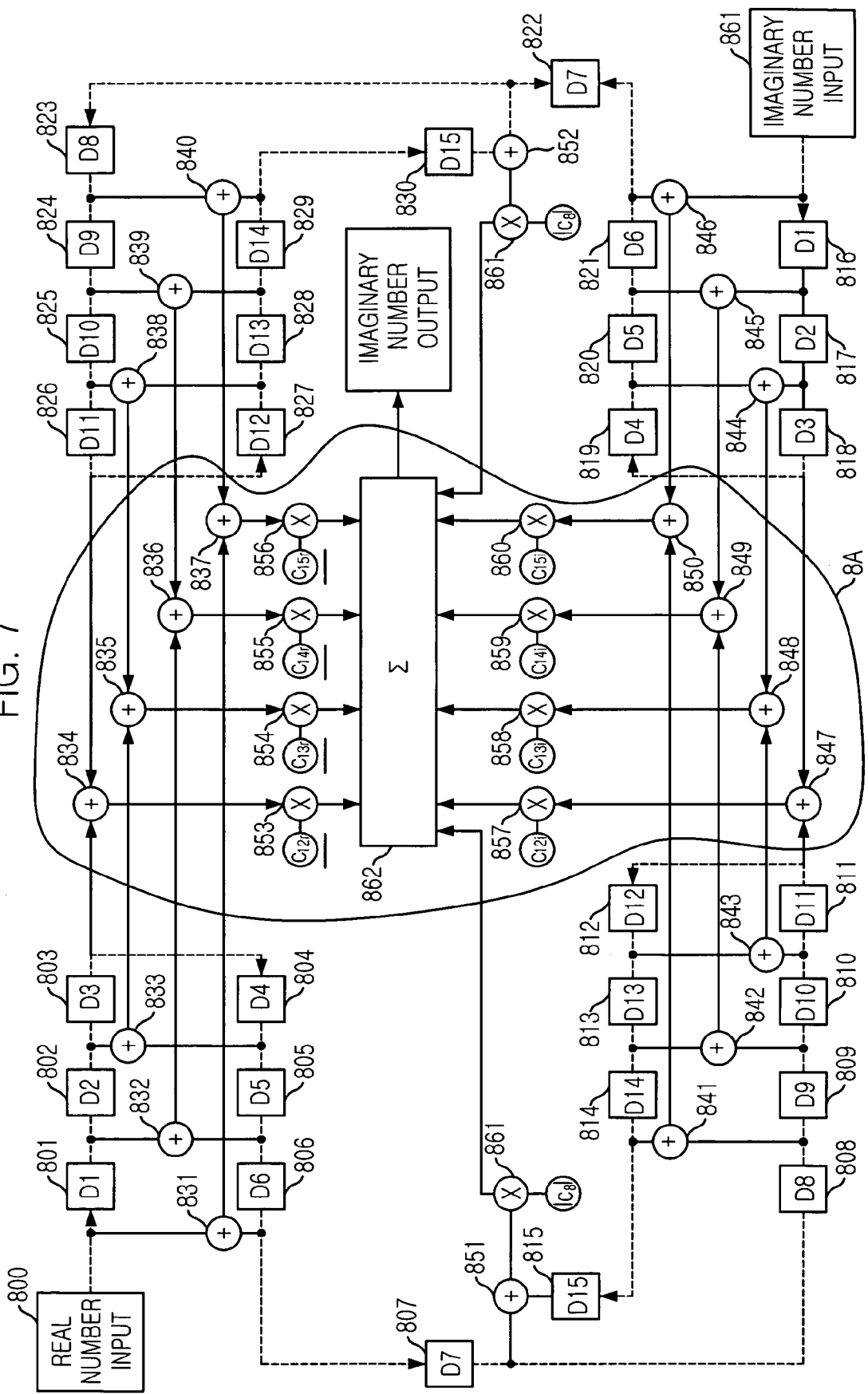
FIG. 7 is a schematic view showing an imaginary number part of a correlation apparatus in accordance with an embodiment of the present invention.

FIG. 7 is a schematic view showing an imaginary number part of a correlation apparatus in accordance with an embodiment of the present invention.

As shown in FIG. 7, the imaginary number part of the correlation apparatus of the present invention includes (2) of the equation 7. Herein, if the correlation coefficient is the real number in the (1) of the equation 7, the (2) of the equation 7 is changed into the imaginary number, just as in the equation 6. If the correlation coefficient is the imaginary number, the (2) of the equation 7 is changed into the real number.

Also, an $R_n$ term multiplied by the correlation coefficient can be made when the term having an imaginary number value is changed into a negative number. For example, in the imaginary number part of the correlation apparatus of the present invention, $C_{12I}(R_{03R}-R_{11I})$ term can be made when $C_{12R}(R_{03R}+R_{11I})$ term is changed as described above. Therefore, the imaginary number part is not different from the real number part except that some adders are changed into subtracters. Table 2 is a corresponding relationship of each adder/subtracter and multiplier of the correlation apparatus shown in FIG. 7.

TABLE 2

| Each term of in Eq. 7 | Adder and multiplier realized to correspond to each term |
|---|---|
| $C_{12r}(R_{03R} - R_{11I}) + _{C12R}(R_{11R} - R_{03I})$ | (853, 834), (857, 847) |
| $C_{13I}(R_{0204R} - R_{1012I}) + _{C13R}(R_{1012R} - R_{0204I})$ | (854, 833, 838, 835), (858, 843, 844, 848) |
| $C_{14I}(R_{0105R} - R_{0913I}) + _{C14R}(R_{0913R} - R_{0105I})$ | (855, 832, 839, 836), (859, 842, 845, 849) |

TABLE 2-continued

| Each term of in Eq. 7 | Adder and multiplier realized to correspond to each term |
|---|---|
| $C_{15I}(R_{0006R} - R_{0814I}) + _{C15R}(R_{0814R} - R_{0006I})$ | (856, 831, 840, 837), (860, 841, 846, 850) |
| $\|C_8\|(R_{07R} + R_{15R} - R_{07I} - R_{15I})$ | (861, 851, 852) |

As described above, the part adding the output of the related tap of the TDL, i.e., $2^{nd}$ and $4^{th}$ taps in the $R_{0204}$, can be applied in the real number part and the imaginary number part of the correlation apparatus of the present invention in common, just as shown in FIGS. 6 and 7. That is, in FIGS. 6 and 7, parts 7A and 8A where the output of the multiplier multiplying the correlation coefficient is added again to the output of the adder adding the output of the related tap become different.

Figure 8:
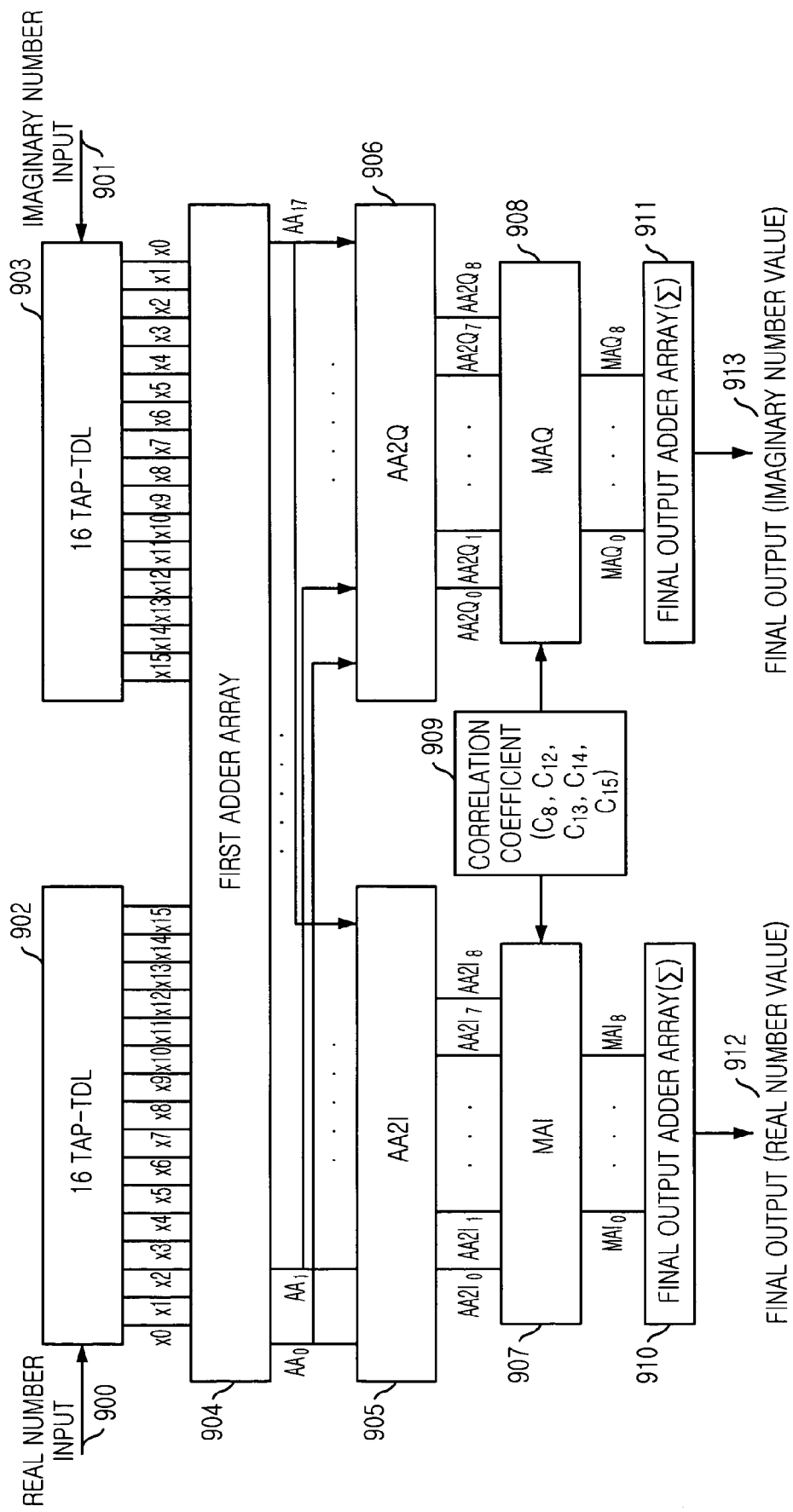
FIG. 8 is a block diagram showing a correlation apparatus in accordance with an embodiment of the present invention.

FIG. 8 is a block diagram showing a correlation apparatus in accordance with an embodiment of the present invention.

As shown in FIG. 8, the input signals of a real number 900 and an imaginary number 901 are delayed through TDLs 902 and 903. The delayed signals are added based on the symmetrical relationship of the correlation coefficient in a first adder array (AA) 904. Each output of the AA, which is AAi, is defined based on the equations of table 3, wherein the i of AAi is an integer number in the range of 0 to 17. Therefore, the number of the adder required for forming the AA is 14, which is expressed as 2×7=14.

TABLE 3

| $AA_{i(i=0...17)}$ | Configuration Item | Referred Rn |
|---|---|---|
| $AA_0$ | $x_3$ | $R_{03R}$ |
| $AA_1$ | $y_{11}$ | $R_{11I}$ |
| $AA_2$ | $Y_3$ | $R_{03I}$ |
| $AA_3$ | $x_{11}$ | $R_{11R}$ |
| $AA_4$ | $X_2 + X_4$ | $R_{0204R}$ |
| $AA_5$ | $y_{10} + y_{12}$ | $R_{1012I}$ |
| $AA_6$ | $y_2 + y_4$ | $R_{0204I}$ |
| $AA_7$ | $X_{10} + X_{12}$ | $R_{1013R}$ |
| $AA_8$ | $X_1 + X_5$ | $R_{0105R}$ |
| $AA_9$ | $y_9 + y_{13}$ | $R_{0913I}$ |
| $AA_{10}$ | $y_1 + y_5$ | $R_{0105I}$ |
| $AA_{11}$ | $X_{10} + X_{13}$ | $R_{1013R}$ |
| $AA_{12}$ | $X_0 + X_6$ | $R_{0006R}$ |
| $AA_{13}$ | $y_8 + y_{14}$ | $R_{0814I}$ |
| $AA_{14}$ | $y_0 + y_6$ | $R_{0006I}$ |
| $AA_{15}$ | $X_8 + X_{14}$ | $R_{0814R}$ |
| $AA_{16}$ | $X_7 + X_{15}$ | $R_{0715R}$ |
| $AA_{17}$ | $Y_7 + y_{15}$ | $R_{0715I}$ |

Subsequently, the output signal calculated through the AA is inputted in the second adder arrays (AA2) 905 and 906. The AA2s 905 and 906 add AA output signals multiplied by the same correlation coefficient in correlation coefficient multiplier arrays 905 and 906 described as follows. Herein, AA2I 905 shown in FIG. 8 outputs the real number value, and AA2Q 906 outputs the imaginary number value. The outputs of the AA2I 905 and the AA2Q 906 are generated based on the equation defined in table 4.

TABLE 4

| $AA2I_{i(i=0...8)}$ | Configuration Item | $AA2Q_{i(i=0...8)}$ | Configuration Item |
|---|---|---|---|
| $AA2I_0$ | $AA_0 + AA_1$ | $AA2Q_0$ | $AA_0 - AA_1$ |
| $AA2I_1$ | $AA_2 + AA_3$ | $AA2Q_1$ | $AA_2 - AA_3$ |

TABLE 4-continued

| $AA2I_{i(i=0...8)}$ | Configuration Item | $AA2Q_{i(i=0...8)}$ | Configuration Item |
|---|---|---|---|
| $AA2I_2$ | $AA_4 + AA_5$ | $AA2Q_2$ | $AA_4 - AA_5$ |
| $AA2I_3$ | $AA_6 + AA_7$ | $AA2Q_3$ | $AA_6 - AA_7$ |
| $AA2I_4$ | $AA_8 + AA_9$ | $AA2Q_4$ | $AA_8 - AA_9$ |
| $AA2I_5$ | $AA_{10} + AA_{11}$ | $AA2Q_5$ | $AA_{10} - AA_{11}$ |
| $AA2I_6$ | $AA_{12} + AA_{13}$ | $AA2Q_6$ | $AA_{12} - AA_{13}$ |
| $AA2I_7$ | $AA_{14} + AA_{15}$ | $AA2Q_7$ | $AA_{14} - AA_{15}$ |
| $AA2I_8$ | $AA_{16} + AA_{17}$ | $AA2Q_8$ | $AA_{16} - AA_{17}$ |

As shown in table 4, the AA2I 905 and the AA2Q 906 include 9 2-input adders and 9 2-input subtracters. Therefore, the AA2 905 and the AA2 906 include a total of 18 2-input adders/subtracters.

The signal going through the AA2s 905 and 906 is multiplied by the correlation coefficient in the correlation coefficient multiplier arrays (MAs) 907 and 908. Herein, the MAI 907 shown in FIG. 8 outputs the real number value and MAQ 908 outputs the imaginary number value. That is, MAs 907 and 908 are multiplied by the AA2s 905 and 906 with only 5 correlation coefficients due to the symmetrical relationship as the equation 2.

The output signals of the MAI 907 and the MAQ 908 are generated by the equation defined in table 5. The values of the real number and the imaginary number of the complex correlation coefficient multiplied by each output signal of the AA2s 905 and 906 in the MAI 907 and the MAQ 908 are exchanged with each other based on symmetry.

TABLE 5

| $MAQ_{i(i=0...8)}$ | Configuration Item | $MAQ_{i(i=0...8)}$ | Configuration Item |
|---|---|---|---|
| $MAI_0$ | $AA2I_0 \times C_{12R}$ | $MAQ_0$ | $AA2Q_0 \times C_{12I}$ |
| $MAI_1$ | $AA2I_1 \times C_{12R}$ | $MAQ_1$ | $AA2Q_1 \times C_{12R}$ |
| $MAI_2$ | $AA2I_2 \times C_{13R}$ | $MAQ_2$ | $AA2Q_2 \times C_{13I}$ |
| $MAI_3$ | $AA2I_3 \times C_{13I}$ | $MAQ_3$ | $AA2Q_3 \times C_{13R}$ |
| $MAI_4$ | $AA2I_4 \times C_{14R}$ | $MAQ_4$ | $AA2Q_4 \times C_{14I}$ |
| $MAI_5$ | $AA2I_5 \times C_{14I}$ | $MAQ_5$ | $AA2Q_5 \times C_{14R}$ |
| $MAI_6$ | $AA2I_6 \times C_{15R}$ | $MAQ_6$ | $AA2Q_6 \times C_{15I}$ |
| $MAI_7$ | $AA2I_7 \times C_{15I}$ | $MAQ_7$ | $AA2Q_7 \times C_{15R}$ |
| $MAI_8$ | $AA2I_8 \times |C_8|$ | $MAQ_8$ | $AA2Q_8 \times |C_8|$ |

Each of the MAI 907 and MAQ 908 includes 9 2-input multipliers, just as shown in the table 5. Also, final output adder arrays 910 and 911 generate a final output signal of the real number and the imaginary number by adding the output signal of the MAs 907 and 908. Herein, the final output adder arrays 910 and 911 require 8 2-input adders to generate a final correlation output of the real number and the imaginary number.

Therefore, the number of the adder required for forming the correlation apparatus of the present invention shown in FIG. 8 is 2×7+9×2+8×2=48, and the number of the multiplier is 2×9=18. That is, the number of the adders is reduced 20% and the number of the multipliers is reduced 70% in comparison with the 62 adders and the 64 multipliers required for the conventional correlation apparatus.

Meanwhile, a difference between the real number part and the imaginary number part of the correlation apparatus of the present invention is that the real number part includes the adder and the imaginary number part includes the subtracter in the AA2, and that the real number part and the imaginary number part of the multiplied correlation coefficient are exchanged with each other in the correlation coefficient MA. Herein, if the operating speed of the correlation apparatus is increased twice as fast as, the constitutional element can be reduced by half. That is, in case that the operating speed of the correlation apparatus is twice as fast as the sample speed of the input signal, if a half of the operating time of the correlation apparatus is controlled to calculate the real number part and the other half is controlled to calculate the imaginary number part, it is possible to reduce the number of the adders used in the AA2 of the correlation apparatus by half, the number of the multiplier used in the MA of the correlation apparatus by half, and the number of the adders used in the final output AA by half, thereby reducing the total number of the adders to 31 and the total number of the multipliers to 9. That is, the correlation apparatus of the present invention can reduce the adders 50% and the multipliers 86% in comparison with the conventional correlation apparatus.

Figure 9:
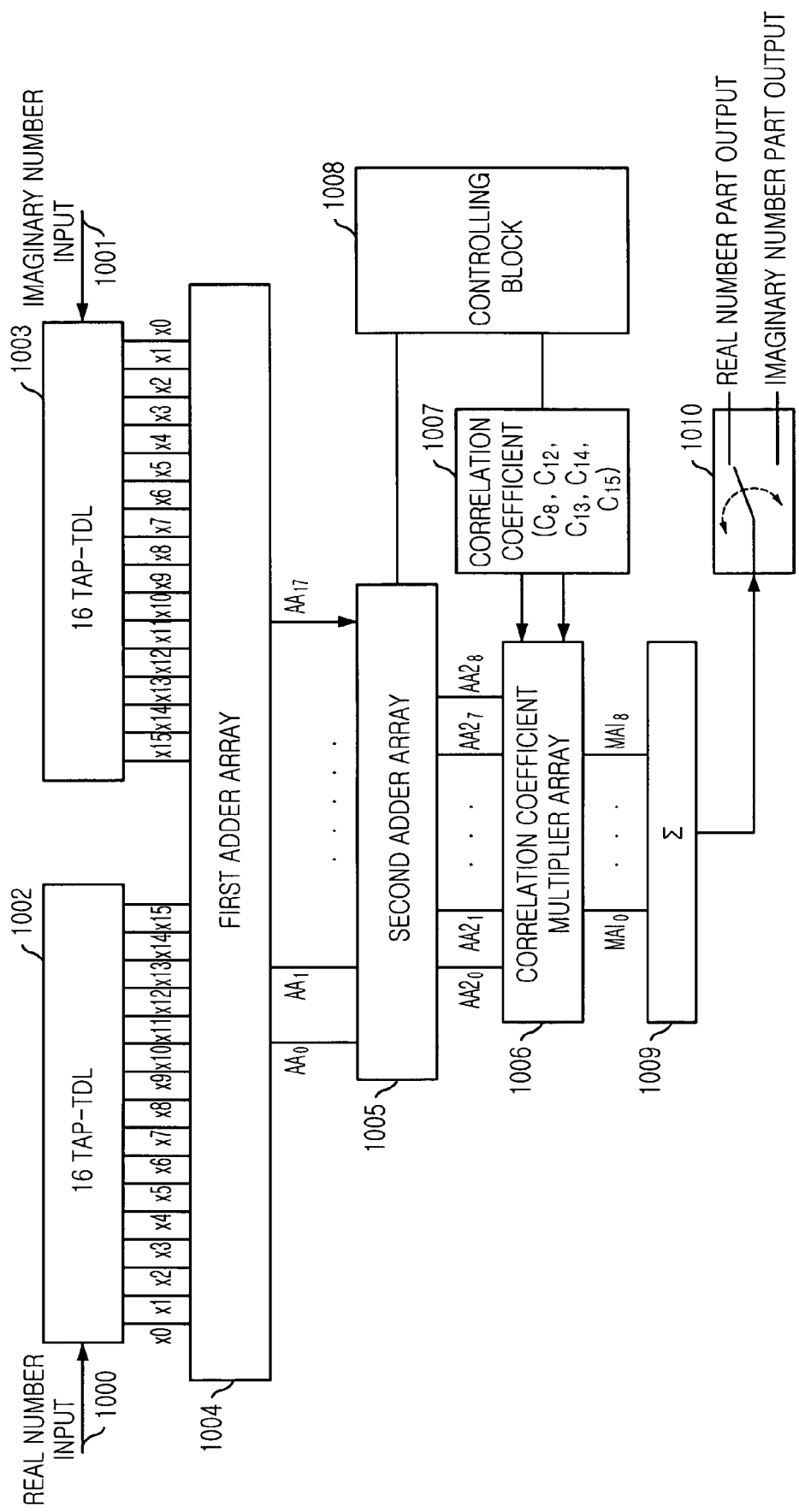
FIG. 9 is a block diagram showing a correlation apparatus when an operating speed is twice as fast as an input signal speed in accordance with an embodiment of the present invention.

FIG. 9 is a block diagram showing a correlation apparatus when an operating speed is twice as fast as an input signal speed in accordance with an embodiment of the present invention.

As shown in FIG. 9, the correlation apparatus of the present invention is different from the correlation apparatus shown in FIG. 8 in a second adder array (AA2) 1005, a correlation coefficient multiplier array (MA) 1006, a correlation coefficient array 1007 and a final output adder array (AA) 1009. A controlling block 1008 for generating a control signal required for a correlation output of the real number part and the imaginary number part is also added.

The AA2 1005 uniting the calculation of the real number part and the imaginary number part adds up to outputs of a first adder array (AA) 1004 calculated in a delay tap 1002 of a real number input 1000 in the real number part calculation. When the imaginary number part is calculated, it performs subtraction on each output of the AA 1004 calculated in a delay tap 1003 of an imaginary number input 1001.

When the complex correlation coefficient is multiplied by the real number part and the imaginary number part of the output signal from the AA2 1005, the correlation coefficient MA 1006 crossly multiplies the real number part and the imaginary number part.

Figure 10:
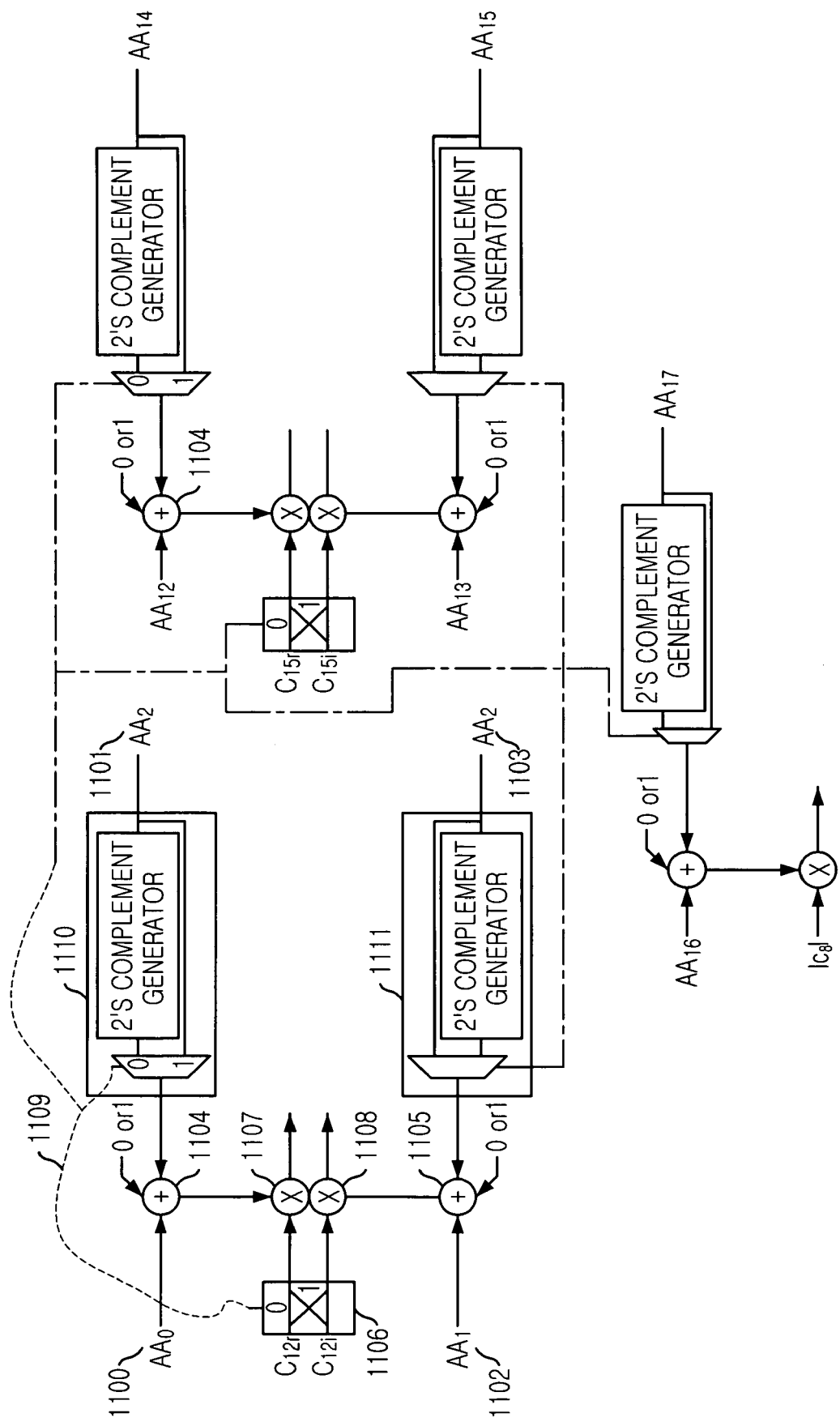
FIG. 10 is a schematic diagram illustrating a second adder array (AA2) and a correlation coefficient multiplier array (MA) in accordance with an embodiment of the present invention.

FIG. 10 is a schematic diagram illustrating a second adder array (AA2) and a correlation coefficient multiplier array (MA) in accordance with an embodiment of the present invention.

As shown in FIG. 10, when a correlation coefficient C12 is multiplied, the AA2 1005 can add or subtract signals AA2 1101 and AA3 1103 generated from the AA 1004 according to a controlling signal 1109.

When the real number part is calculated, output signals AA0 1100, AA1 1102, AA2 1101 and AA3 1103, which are generated from the AA 1004, should be added individually. The output signals AA0 1100 and AA1 1102 are not changed in calculation of the real number part and the imaginary number part, but AA2 1101 and AA3 1103, which are output values of a first adder array (AA) 1104 adding a tapped delay value, are changed in the real number part and the imaginary number part. That is, when the real number part is calculated, the input value is added, and when the imaginary number part is calculated, the input value is subtracted. Therefore, the switches or multiplexers 1110 and 1111 are required to select the output values AA2 1101 and AA3 1103, or a negative number.

Switches 1110 and 1111 shown in FIG. 10 output the input signals according to the controlling signal or signals taking a 2's complement of the input signals. The signals going through the switches 1110 and 1111 are connected to adders 1104 and 1105 capable of setting up a carry input as 0 or 1 by the controlling signal in case of the real number. Therefore, the adders 1104 and 1105 add "0" in case of the real number and "1" in case of the imaginary number. In the binary system, the subtraction is the same as adding 1 to the 2's complement.

In case of the multiplier, the real number part and the imaginary number part of the correlation coefficient are changed with each other and multiplied according to the controlling signal. For the operation, the real number value and the imaginary number value of the correlation coefficient are outputted according to the controlling signal, or a 2×2 switch 1106 is required to change the locations of the real number value and the imaginary number value and output them.

Therefore, in the real number part calculation of the correlation apparatus, the correlation coefficient of the real number is multiplied by the first multiplier 1107 and the correlation coefficient of the imaginary number is multiplied by a second multiplier 1108. In calculation of the imaginary number part, the correlation coefficient of the imaginary number is multiplied by a first multiplier 1107 and the correlation coefficient of the real number is multiplied by a second multiplier 1108. The multiplied values are added in a final output adder array (AA) 1009. The method described above is applied when the remaining correlation coefficients are multiplied. Since one multiplier is used to multiply the coefficient of C8, an additional switch is not required. The output of the calculated correlation coefficient MA 1006 passes through the final output AA 1009, and becomes the output of the final correlation apparatus passing through a switch 1010 for keeping the signal as an original sample speed value of the reception input.

Figure 11:
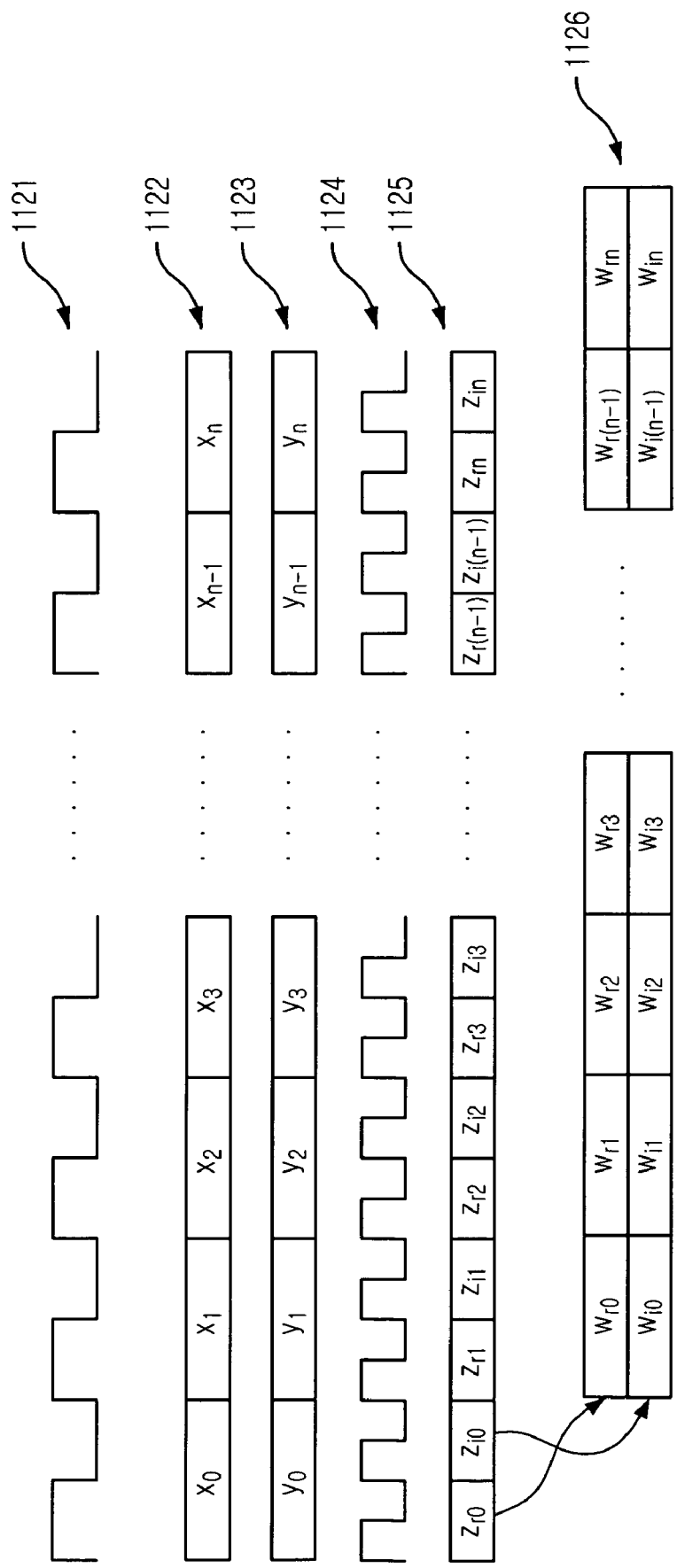
FIG. 11 is a timing diagram when operating speed of the correlation apparatus is twice as fast as the speed of a reception input in accordance with an embodiment of the present invention.

FIG. 11 is a timing diagram when operating speed of the correlation apparatus is twice as fast as the speed of a reception input in accordance with an embodiment of the present invention.

In FIG. 11, a diagram 1121 shows a reception input sampling clock, and a diagram 1122 shows a real number part input of the receiving signal. A diagram 1123 shows an imaginary number part of the receiving signal and a diagram 1124 shows an operation clock of the correlation apparatus. A diagram 1125 shows an output of the correlation apparatus calculated for each sample, and a diagram 1126 of FIG. 11 shows an output of the correlation apparatus arranged at the same sample speed as that of the reception input signal.

As shown in the diagrams 1122 and 1123 of FIG. 11, when the complex reception input signal is inputted as (x0, x1, ... )+j(y0, y1, ... ), the output of the correlation apparatus alternately calculates the real number part and the imaginary number part for each operation sample, which is shown in the diagram 1124 of FIG. 11. Also, as shown in the diagram 1125 of FIG. 11, if the alternately calculated output signal is rearranged and outputted at the sample speed of the complex input, the output of the time when the operating time of the correlation apparatus becomes the same as the sampling speed of the reception input signal.

FIG. 12 is a flowchart describing a correlation procedure using symmetry of a correlation coefficient in accordance with an embodiment of the present invention.

As shown in FIG. 12, at step S1210, a complex signal sequence received from the outside is delayed for each sample unit.

At step S1220, the delayed complex signal sequence is added, just as an equation of the table 3.

At step S1230, among the added and outputted signals, those to be multiplied by a common correlation coefficient are added as shown in the equations of the table 4. That is, when a real number part is calculated in the step S1230, among the outputted signals of the step S1220, those to be multiplied by a common correlation coefficient are added. When an imaginary number block is calculated, among outputted signals of the step S1220, those to be multiplied by a common correlation coefficient are subtracted from each other.

At step S1240, the signal added in the step S1230 is multiplied by a complex correlation coefficient of a complex correlation coefficient sequence, which is a reference sequence for synchronization detection, as shown in table 5. Herein, when the real number part and the imaginary number part are calculated, the real number and the imaginary number parts of the complex correlation coefficient are changed with each other and multiplied when the real number part is calculated, and when the imaginary number part is calculated.

At step S1250, a final correlation signal is outputted by adding a signal multiplying a complex correlation coefficient.

In case of using symmetry just as equation 2 of the SP used to secure wireless synchronization, the complexity of the hardware can be reduced, which is shown in table 6. That is, in case of using symmetry and having the same sample speed, the multiplier and the adder can be reduced by 70% and 20%, respectively. In case that the sample speed is twice as fast, the multipliers and the adders can be reduced by 86% and 50% respectively.

TABLE 6

| adder/multiplier | When symmetry is not used | When symmetry is used | |
|---|---|---|---|
| | | Same sample speed | sample speed twice as fast |
| 2-input multiplier | 16 × 4 = 64 | 9 × 2 = 18 | 9 |
| 2-input multiplier | 62 | 48 | 31 |

As described above, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present invention can reduce the multipliers and the adder by 70% and 20% respectively, in comparison with the conventional correlation apparatus, by using symmetry of the correlation efficient.

Also, in case where the operating speed is twice as fast as sample speed of a complex input signal, the present invention can reduce the multipliers and the adders by 86% and 50% respectively, thereby reducing the complexity of the hardware remarkably.

The present application contains subject matter related to Korean patent application No. 2004-0104797, filed with the Korean Intellectual Property Office on Dec. 13, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A correlation apparatus for correlating a complex correlation coefficient sequence which is symmetrical with respect to a received complex signal sequence having a plurality of M real and M imaginary inputs, comprising:

a delaying unit for delaying the received complex signal sequence;

a first adding unit for adding the complex signal sequence delayed in the delaying unit;
a second adding unit for adding each output signal of the first adding unit;
a correlation coefficient multiplying unit for multiplying each output signal of the second adding unit by a complex correlation coefficient of the complex correlation coefficient sequence of a plurality of N complex correlation coefficients; and
a final output adding unit for adding each output signal of the correlation coefficient multiplying unit,
wherein N is less than M/2 for reduction of hardware for the correlation apparatus, and
wherein N and M are integers.

2. The apparatus as recited in claim 1, wherein the second adding unit adds each output signal of the first adding unit in calculation of a real number part, and subtracts each output signal of the first adding unit in calculation of an imaginary number part.

3. The apparatus as recited in claim 1, wherein the real number part and the imaginary number part of the complex correlation coefficient are changed with each other and multiplied in the correlation coefficient multiplying unit when the real number part and the imaginary number part are calculated.

4. The apparatus as recited in claim 1, further comprising:
a controlling unit for controlling the second adding unit and the correlation coefficient multiplying unit;
wherein the controlling unit controls the second adding unit to add or subtract each output signal from the first adding unit, and change the position of the values of the real number part and the imaginary number part of the complex correlation coefficient with each other.

5. The apparatus as recited in claim 4, wherein the complex correlation coefficient sequence has symmetry, which is expressed as;

(1)
$$C\left(n + \frac{L}{2}\right) = \underline{C(n)} = y(n) + jx(n)\Big|_{n=0,1,2,\ldots,7}$$

(2)
$$C\left(\frac{L}{4} + m\right) = C\left(\frac{L}{4} - m\right)_{m=1,2,3}$$

(3)
$$C\left(m + \frac{3 \cdot L}{4}\right) = C\left(\frac{3 \cdot L}{4} - m\right)_{m=1,2,3}$$

where C(n), which is a complex correlation coefficient, is expressed as x(n)+jy(n); C(n) is the real number part and is expressed as y(n)+jx(n) because the imaginary number part of the complex correlation coefficient are changed with each other; and L is a length of the complex correlation coefficient.

6. The apparatus as recited in claim 5, wherein the complex correlation coefficient sequence is a short preamble (SP) sequence of an Orthogonal Frequency Division Multiplexing (OFDM) scheme.

7. A correlation method based on symmetry of a complex correlation coefficient sequence, comprising:
delaying each of a plurality of M real and imaginary M inputs of a received complex signal sequence;
adding the complex signal sequence of the delayed complex signal sequence;
adding the output signals of the added and delayed complex signal sequence to be multiplied by a common correlation coefficient;
multiplying the added output signals of the added and delayed complex signal by the complex correlation coefficient of the complex correlation coefficient sequence having of a plurality of N complex correlation coefficients; and
adding the multiplied added output signal of the added output signal of the added and delayed complex signal by the complex correlation coefficient,
wherein N is less than M/2 for reduction of hardware for the correlation apparatus, and
wherein N and M are integers.

8. The apparatus as recited in claim 7, wherein the added output signals to be multiplied by the common correlation coefficient and the outputted complex signal sequence of the delayed received complex signal sequence, each output signal of the the complex signal sequence of the delayed received complex signal sequence is added in calculation of the real number part, and each output signal of the the complex signal sequence of the delayed received complex signal sequence is subtracted in calculation of the imaginary number part.

9. The apparatus as recited in claim 7, wherein the real number part and the imaginary number part of the complex correlation coefficient are changed with each other multiplied by the multiplied complex correlation coefficient.

10. The apparatus as recited in claim 7, wherein the complex correlation coefficient sequence is a short preamble (SP) sequence of an Orthogonal Frequency Division Multiplexing (OFDM) scheme.

* * * * *